US010311564B2

(12) United States Patent
Konishi

(10) Patent No.: US 10,311,564 B2
(45) Date of Patent: Jun. 4, 2019

(54) IMAGE PROCESSING DEVICE, IMAGE SENSOR, AND IMAGE PROCESSING METHOD

(71) Applicant: OMRON Corporation, Kyoto-shi, Kyoto (JP)

(72) Inventor: Yoshinori Konishi, Seika-cho (JP)

(73) Assignee: OMRON Corporation, Kyoto-shi (JP)

(*) Notice: Subject to any disclaimer, the term of this patent is extended or adjusted under 35 U.S.C. 154(b) by 219 days.

(21) Appl. No.: 15/121,800

(22) PCT Filed: Mar. 14, 2014

(86) PCT No.: PCT/JP2014/056998
§ 371 (c)(1),
(2) Date: Aug. 26, 2016

(87) PCT Pub. No.: WO2015/136709
PCT Pub. Date: Sep. 17, 2015

(65) Prior Publication Data

US 2017/0024869 A1 Jan. 26, 2017

(51) Int. Cl.

| | |
|---|---|
| ***G06T 7/00*** | (2017.01) |
| ***G06K 9/62*** | (2006.01) |
| ***G06K 9/68*** | (2006.01) |

(52) U.S. Cl.
CPC ............ *G06T 7/001* (2013.01); *G06K 9/6202* (2013.01); *G06K 9/6857* (2013.01); (Continued)

(58) Field of Classification Search
CPC ........... G06T 7/001; G06T 2207/10024; G06T 2207/30164; G06T 2207/20016; G06K 9/6857; G06K 9/6202
See application file for complete search history.

(56) References Cited

U.S. PATENT DOCUMENTS

| | | | |
|---|---|---|---|
| 7,636,478 | B2 | 12/2009 | Bryll |
| 2007/0052818 | A1 | 3/2007 | Makino et al. |

(Continued)

FOREIGN PATENT DOCUMENTS

| | | | |
|---|---|---|---|
| CN | 101138008 | A | 3/2008 |
| CN | 101604387 | A | 12/2009 |

(Continued)

OTHER PUBLICATIONS

Yoshinori Konishi et al, "Fast and Precise Template Matching Based on Oriented Gradients", Computer Vision—ECCV 2012. Workshops and Demonstrations, Oct. 7, 2012, pp. 607-610, vol. 7585, Springer.

(Continued)

*Primary Examiner* — Yon J Couso
(74) *Attorney, Agent, or Firm* — Metrolexis Law Group, PLLC

(57) ABSTRACT

An image processing device is provided with a storage unit configured to store for each model among a plurality of models, a model template obtained by reducing a model image; an image reduction unit configured to reduce an input image by the reduction ratio for each model; and a search unit configured to search for the location of a model in an input image on the basis of a reduced input image and a model template. The storage unit stores model templates for at least two of the models wherein said model templates are obtained by reducing the model images by the same reduction ratio; and The image reduction unit processes the at least two models jointly. The image processing device is hereby capable of high-speed identification and recognition of a plurality of models from an input image.

16 Claims, 10 Drawing Sheets

(52) U.S. Cl.
CPC ............... *G06T 2207/10024* (2013.01); *G06T 2207/20016* (2013.01); *G06T 2207/30164* (2013.01)

(56) References Cited

U.S. PATENT DOCUMENTS

| | | | | |
|---|---|---|---|---|
| 2009/0309878 | A1 | 12/2009 | Otani et al. | |
| 2010/0034476 | A1* | 2/2010 | Kido | G06K 9/6203 382/243 |
| 2012/0045095 | A1* | 2/2012 | Tate | G06T 5/003 382/103 |
| 2012/0294487 | A1* | 11/2012 | Nishimura | G06K 9/00986 382/103 |
| 2015/0262346 | A1* | 9/2015 | Horita | B25J 9/1697 348/137 |
| 2015/0345936 | A1* | 12/2015 | Sumitomo | G06T 7/001 348/135 |

FOREIGN PATENT DOCUMENTS

| | | | |
|---|---|---|---|
| JP | H05-303643 | A | 11/1993 |
| JP | 2006-202184 | A | 8/2006 |
| JP | 2010-067246 | A | 3/2010 |
| JP | 4561380 | B2 | 10/2010 |

OTHER PUBLICATIONS

Gavrila D. M. et al, “Real-Time Object Detection for “Smart” Vehicles”, Computer Vision, The Proceedings of the Seventh IEEE International Conference, Sep. 20, 1999, pp. 87-93, vol. 1, IEEE.

The extended European search report dated Oct. 19, 2017 in the counterpart European patent application.

The Chinese Office Action (CNOA) dated Apr. 18, 2018 in a counterpart Chinese Patent application.

Wang Zhou et al., “Infrared target tracking algorithm based on reduced resolution”, Applied Science and Technology, Mar. 31, 2007, pp. 54-56, vol. 34, No. 3. Relevance is indicated in CNOA issued on Apr. 18, 2018.

Yoshinori Konishi et al., “Fast and Precise Template Matching Based on Oriented Gradients”, Springer-Verlag Berlin Heidelberg, Dec. 31, 2012, pp. 607-610, Part 3. Relevance is indicated in CNOA issued on Apr. 18, 2018.

* cited by examiner

FIG. 6
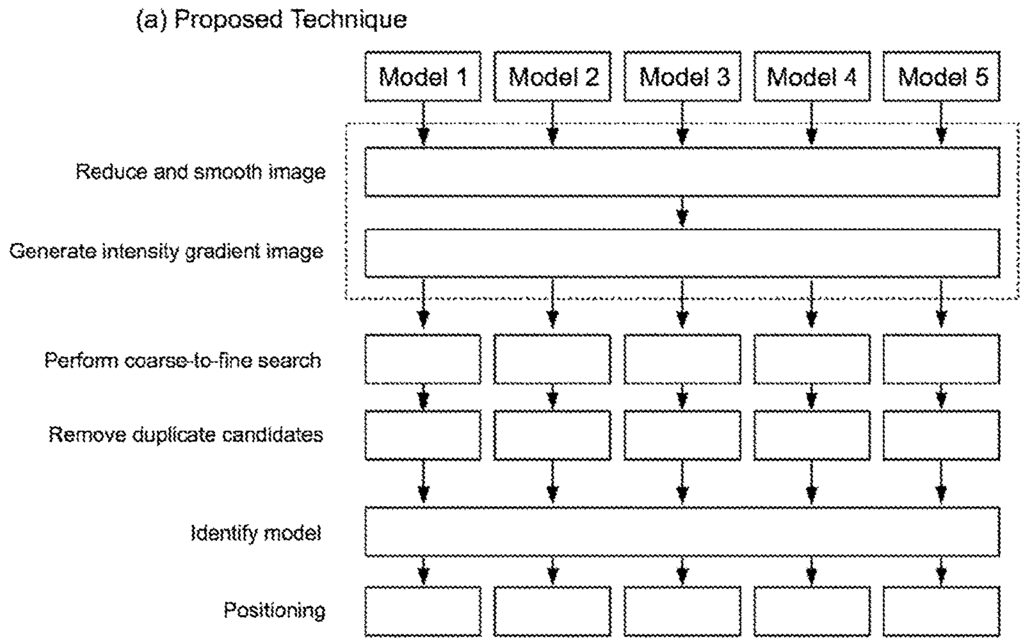
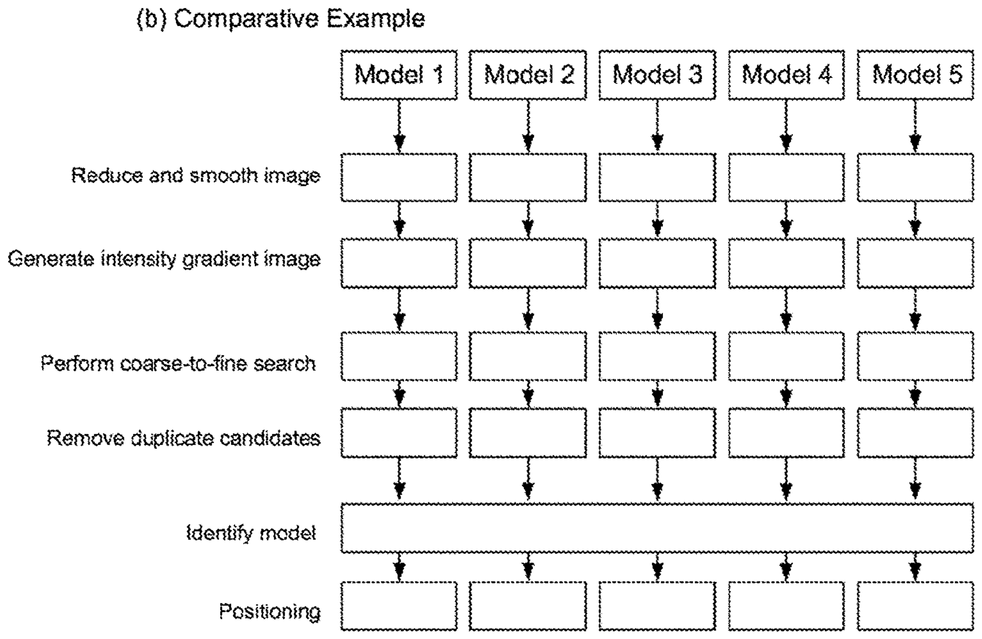

| GROUP | Model (Provisional Reduction Ratio) | Mean Value | Standard Deviation |
|---|---|---|---|
| G1 | A(0.3) B(0.32) | 0.315 | 0.021 |

← OK: Grouping fits criteria (b)

| GROUP | Model (Provisional Reduction Ratio) | Mean Value | Standard Deviation |
|---|---|---|---|
| G1 | A(0.3) B(0.33) C(0.42) | 0.35 | 0.062 |

← NG: Grouping does not fit criteria (c)

| GROUP | Model (Provisional Reduction Ratio) | Mean Value | Standard Deviation |
|---|---|---|---|
| G1 | A(0.3) B(0.33) | 0.315 | 0.021 |
| G2 | C(0.42) D(0.65) | 0.535 | 0.162 |

← NG: Grouping does not fit criteria (d)

| GROUP | Model (Provisional Reduction Ratio) | Mean Value | Standard Deviation |
|---|---|---|---|
| G1 | A(0.3) B(0.33) | 0.315 | 0.021 |
| G2 | C(0.42) | 0.420 | 0.000 |
| G2 | D(0.65) E(0.67) | 0.660 | 0.014 |

← OK: Grouping fits criteria (e)

| GROUP | Model (Provisional Reduction Ratio) | Mean Value | Standard Deviation |
|---|---|---|---|
| G1 | A(0.3) B(0.33) | 0.315 | 0.021 |
| G2 | C(0.42) | 0.420 | 0.000 |
| G2 | D(0.65) E(0.67) F(0.71) | 0.677 | 0.031 |

← OK: Grouping fits criteria (f)

| GROUP | Model (Provisional Reduction Ratio) | Mean Value | Standard Deviation |
|---|---|---|---|
| G1 | A(0.3) B(0.33) | 0.315 | 0.021 |
| G2 | C(0.42) | 0.420 | 0.000 |
| G2 | D(0.65) E(0.67) F(0.71) G(0.75) | 0.695 | 0.044 |

← OK: Grouping fits criteria

IMAGE PROCESSING DEVICE, IMAGE SENSOR, AND IMAGE PROCESSING METHOD

FIELD

The present invention relates to techniques for identifying and recognizing a model from an input image.

BACKGROUND

Sensor devices can measure and inspect items conveyed along the production line (hereafter, work piece(s)), and are thus quite popular in factory automation (FA). These sensor devices are typically referred to as image sensors or visual sensors. The image sensor may be configured from a camera and an image processing device, and matches a preliminarily registered teaching object (also known as a model or pattern) to detect a work piece in an image and further extract the required information or perform a measurement. The output from the image sensor may be used for various purposes, such as recognizing, inspecting, or sorting the work pieces.

An increasingly popular production format in FA involves conveying a plurality of different types of work pieces mixed together on the same line and apply different kinds of processes based on the type of work piece. For instance, different types of work pieces flow randomly via a conveyor on a production line for packaging an assortment of products. Picker robots then pick up, correctly position, and pack the different categories of work pieces. Furthermore, a high-variety low-volume line can manufacture a product series where the specifications such as the shape, color, size of the work pieces differ slightly; here, the processing method, inspection requirements, or the like may differ for each specification.

Recognizing (as well as detecting or searching) for a plurality of models from an image is necessary on a line flowing a mix of a plurality of different types of work pieces (hereafter, “mixed flow production line”). Objects may be recognized using a single model. In this case, to shorten the processing time, reduce the memory usage, and improve accuracy, a model image is decimated to generate a model template. The input image is decimated using the same reduction ratio as the model template and the search takes place using the reduced input image (refer to Patent Document 1). This technique is particularly effective for registered models with large image data. The reduction ratio may be determined so that the number of feature points contained in the model is a predetermined number of feature points, or may be determined so that the area of a registered region is a predetermined size.

Since a plurality of models need to be recognized on a mixed flow production line, the above-mentioned search process must be repeated for the number of models. Accordingly, the processing time increases as the number of models grows.

Another method uses multi-resolution images (i.e., an image pyramid) to detect an object. This method establishes a reduction ratio b for a template, $b=a^N$, where a, is the reduction ratio of the pyramid image, and N is an integer greater than or equal to 2 (refer to Patent Document 2). The method reduces the number of pyramid images and the number of templates used for matching, and thereby improves the speed of the detection process. However this method is unsuitable when the objects for detection are of different types.

RELATED ART DOCUMENTS

Patent Documents

Patent Document 1: Japanese Unexamined Patent Application Publication No. 2010-67246

Patent Document 2: Japanese Unexamined Patent Application Publication No. 2006-202184

SUMMARY

Technical Problem

In light of the foregoing, embodiments of the invention provide an image processing technique that allows for high-speed identification and recognition of a plurality of models from an input image.

Solution to Problem

To address the foregoing embodiments of the invention as much as possible selects a reduction ratio that is the same for [some or possibly all] the models. Preprocesses such as reduction of the input image and the like are performed jointly on the models with the same reduction ratio to reduce the number of permutations and thereby improve processing speed.

More specifically, an image processing device according to embodiments of the invention is configured for identifying or recognizing a plurality of models in an input image. The image processing device is provided with: a storage unit configured to store for each model among a plurality of models, a model template obtained by reducing a model image; an image reduction unit configured to reduce an input image by the reduction ratio of each model; and a search unit configured to search for the location of a model in an input image on the basis of a reduced input image and a model template. The storage unit stores model templates for at least two of the models wherein said model templates are obtained by reducing the model images by the same reduction ratio; and the image reduction unit processes the at least two models jointly.

The image reduction process is performed on the entire image and comparatively, is computationally expensive. In particular the higher the resolution of the input image, the greater the computational expense. Embodiments of the invention presume that models can be given the same reduction ratio. The image reduction process is applied jointly to the models with the same reduction ratio, thus reducing the overall computational expense of the process. Additionally, other preprocesses such as smoothing or feature calculation may also be shared among models.

An image processing device according to embodiments of the invention may be further provided with a model image input unit configured to receive a model image for each of the models; a provisional reduction ratio selection unit configured to determine a provisional reduction ratio for each of the model images; a reduction ratio selection unit configured to select a reduction ratio for each model image on the basis of the provisional reduction ratios for the plurality of model images; and a model template generator configured to generate a model template for each of the model images by reducing the model image using the corresponding reduction ratio, and to store the reduction ratio in association with the model template in the storage unit.

The provisional reduction ratio selection unit may reference a predetermined criterion to select an ideal provisional reduction ratio for each of the model images. On the one hand, processing speed improves as the reduction ratio increases, however reduction ratio that is too high negatively impacts the accuracy of identification or recognition. Consequently, each model image has a suitable reduction ratio that takes into account the trade-off between processing speed and accuracy. In this way the provisional reduction ratio is ideal; for example, the provisional reduction ratio can be determined in accordance with reducing the number of feature points contained in a model to a predetermined number of feature points or reducing the area of the model image to a predetermined size.

For example, the actual reduction ratio can be obtained from the provisional reduction ratio as follows. In other words, the reduction ratio selection unit may group the plurality of model images so that the variation among the provisional reduction ratios within a group is at or below a predetermined threshold; and The variation among the provisional reduction ratios within a group may be represented by, for instance, a standard deviation or the dispersion of the provisional reduction ratios. The grouping (clustering) process may be carried out using any desired clustering algorithms such as k-means clustering. The grouping process may also involve separating the model images into groups using round-robin and discovering the groupings that satisfy the above-mentioned criteria. Here, the reduction ratio applied to the model images within a group may be determined from the mean, the median, the mode or the like of the provisional reduction ratios for the model images within said group.

The actual reduction ratio may also be obtained from the provisional reduction ratio as follows. That is, the reduction ratio selection unit may store a plurality of preliminarily determined reduction ratios; and select a reduction ratio from the plurality of predetermined reduction ratios that corresponds the provisional reduction ratio of a model image as the reduction ratio of said model image. The reduction ratio corresponding to a provisional reduction ratio may be the reduction ratio that neighbors the provisional reduction ratio. The criteria of closeness can be set as appropriate and may be, for instance, merely a difference, a difference of two squares, or the like. The reduction ratio corresponding to a provisional reduction ratio may be the smallest reduction ratio no less than the provisional reduction ratio or the largest reduction ratio no greater than the provisional reduction ratio.

Note that the invention may be implemented as an image processing device having at least a portion of the above mentioned features. The invention may also be implemented as an image sensor containing a camera that captures images of objects, and an image processing device.

The invention may also be implemented as an image processing device for generating model templates. Another aspect of the invention is an image processing device for generating model templates for a plurality of models. This image processing device may be provided with a model image input unit configured to receive a model image for each of the models; a provisional reduction ratio selection unit configured to determine a provisional reduction ratio for each of the model images; a reduction ratio selection unit configured to select a reduction ratio for each model image on the basis of the provisional reduction ratios for the plurality of model images; a model template generator configured to generate a model template for each of the model images by reducing the model image using the corresponding reduction ratio; and an output unit configured to output the model template generated together with the corresponding reduction ratio. The method for selecting the actual reduction ratio may involve grouping on the basis of the provisional reduction ratios or selecting a corresponding reduction ratio from among preliminarily determined reduction ratios, as above described.

The invention may also be implemented as an image processing method including at least a portion of the above-described processes; furthermore, this image processing method may be implemented as a computer program for execution on a computer, or as a computer readable medium with the computer program permanently recorded thereon. The above-mentioned configurations and processes may be freely combined with each other insofar as is technically possible to configure the invention.

Effects

Embodiments of the invention are capable of high-speed identification and recognition of a plurality of models from an input image.

BRIEF DESCRIPTION OF THE DRAWINGS

FIGS. 6(*a*), 6(*b*) are for describing the results of the search according to the embodiment;

FIGS. 9(*a*) to 9(*f*) are for describing the grouping process; and

DETAILED DESCRIPTION

The invention relates to a method of image identification where images (i.e., template images) are registered in advance; when provided with the input image, the method uses template matching to output the registered image that most closely matches the input image. This method may be used in object identification, such as by image sensors in factory automation, in computer vision, or machine learning. The method may also be applied to content-based image retrieval where a query image is used to detect and output similar images from within an image database. What follows is a description of one preferable application, namely, an FA image sensor that implements aspects of the invention. The FA image sensor detects and categorizes each work piece on a mixed flow production line whereon a plurality of different types of work pieces are conveyed mixed together.

The Image Sensor

The overall configuration and applicable situations for an image sensor according to an embodiment of the invention is described with reference to FIG. 1.

The image sensor 1 may be installed along a production line. The image sensor system uses an image acquired by capturing an image of a production item (work piece 2) to identify the type work piece 2. Note that the image sensor 1 may be provided with various other image processing functions, such as detecting edges, scratches, or dirt, or measuring the area, length or center of gravity as needed.

Figure 1:
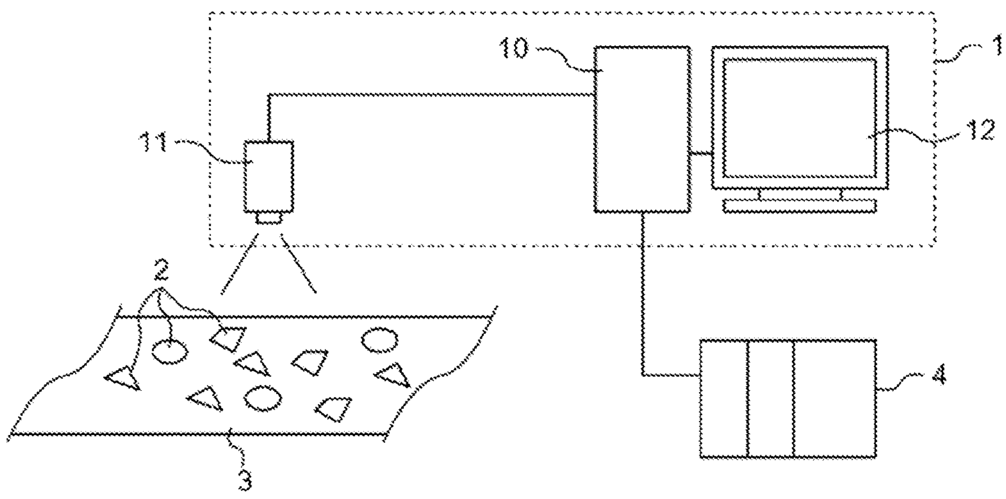
FIG. 1 illustrates an overall configuration of an image sensor.

As illustrated in FIG. 1, a mix of a plurality of different types of work pieces 2 flows on a conveyor 3. The image sensor 1 acquires an image from the camera 11 periodically, or on receiving a trigger signal sent from a programmable logic controller (PLC) 4. The image processing device 10 (image identification device) detects the work pieces 2 contained in the image, executes processing such as type classification and the like, and shows the result on a display 12, or outputs the results to an external device such as the PLC 4. The PLC 4 controls manufacturing devices such as the image sensor 1, the conveyor 3, robots (not shown), and the like.

Hardware Configuration of the Image Sensor

Figure 2:
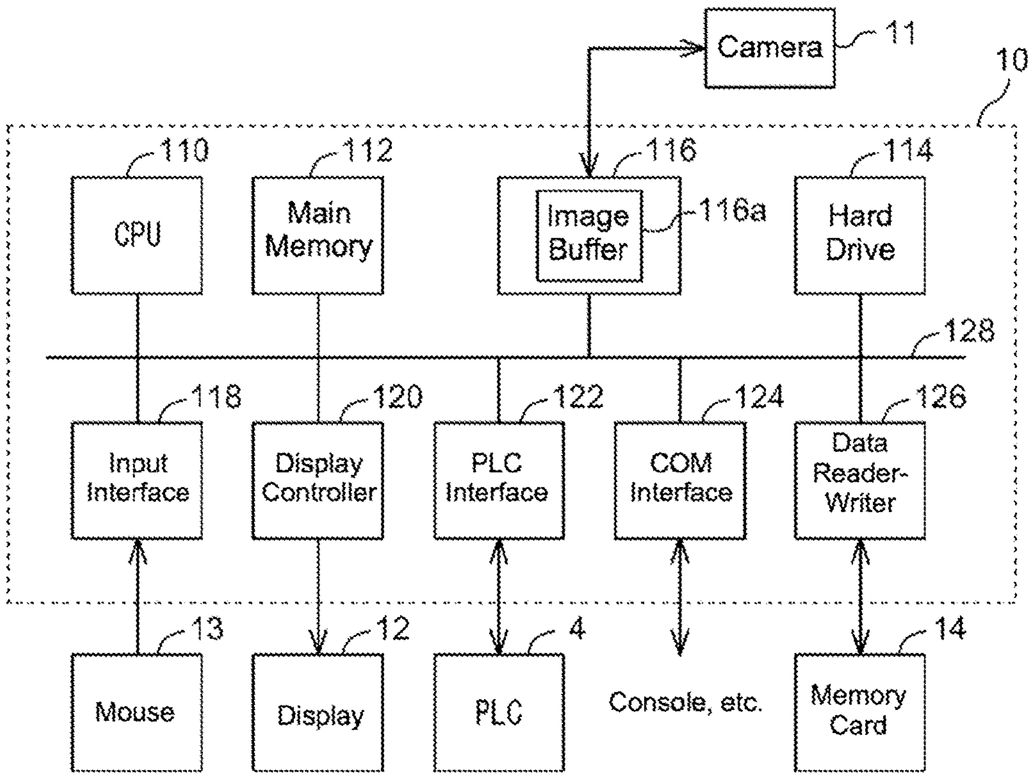
FIG. 2 illustrates a hardware configuration of the image sensor.

A hardware configuration for the image sensor 1 is described with reference to FIG. 2. An image sensor 1 may be configured from a camera 11 and an image processing device 10.

The camera 11 acquires images for the image processing device 10. A complementary metal-oxide-semiconductor (CMOS) camera or a charge-coupled device (CCD) camera may be suitably used for the camera 11. Any desired format (in terms of resolution, color or monochrome, still or video, gradient, and in terms of the data type, and the like) may be used for the input image. The format for the input image may be selected as appropriate according to the type of work piece 2 or the objective for using sensing. The appropriate camera may be selected when special non-visible light images, such as x-ray or thermal images, or information such as depth (distance) and the like are to be used for inspection.

The image processing device 10 includes a central processing unit (CPU) 110; a main memory 112 and a hard drive 114 as storage units; a camera interface 116; an input interface 118; a display controller 120; a PLC interface 122; a communication interface 124; and a data reader-writer 126. Each of these components is capable of mutual data communication via a bus 128.

The camera interface 116 mediates data transmission between the CPU 110 and the camera 11, and includes an image buffer 116*a* for temporarily storing image data from the camera 11. The input interface 118 mediates data transmission between the CPU 110 and an input device such as a mouse 13, a keyboard, a touchscreen panel, a jog controller and the like. The display controller 120 is connected to a display 12 such as a liquid crystal monitor, and controls what is shown on the display 12. The PLC interface 122 mediates the data transmission between the CPU 110 and the PLC 4. The communication interface 124 mediates data transmission between the CPU 110 and a console (or, a personal computer, a server device, or the like). The data reader-writer 126 mediates the data transmission between the CPU 110 and the memory card 14, which is a recording medium.

The image processing device 10 can be configured from a general purpose computer whereby the CPU 110 reads and executes a program stored on the hard drive 114 or the memory card 14 to provide the various desired functions. This kind of program is run while stored on a computer readable recording medium such as the memory card 14 or an optical disc.

When implementing the image processing device 10 through a general-purpose computer, an operating system (OS) may be installed to provide the computer with basic functions, in addition to an application installed to provide functions according to the embodiment. In this case the program provided according to the embodiment may use program modules provided by the OS to realize the desired functions. Note that a program according to the embodiment may be provided as a standalone application program, or may be provided as a module within another program. Finally, these functions may be replaced in whole or in part by a dedicated hardware circuit.

Image Processing Device: Functions

Figure 3:
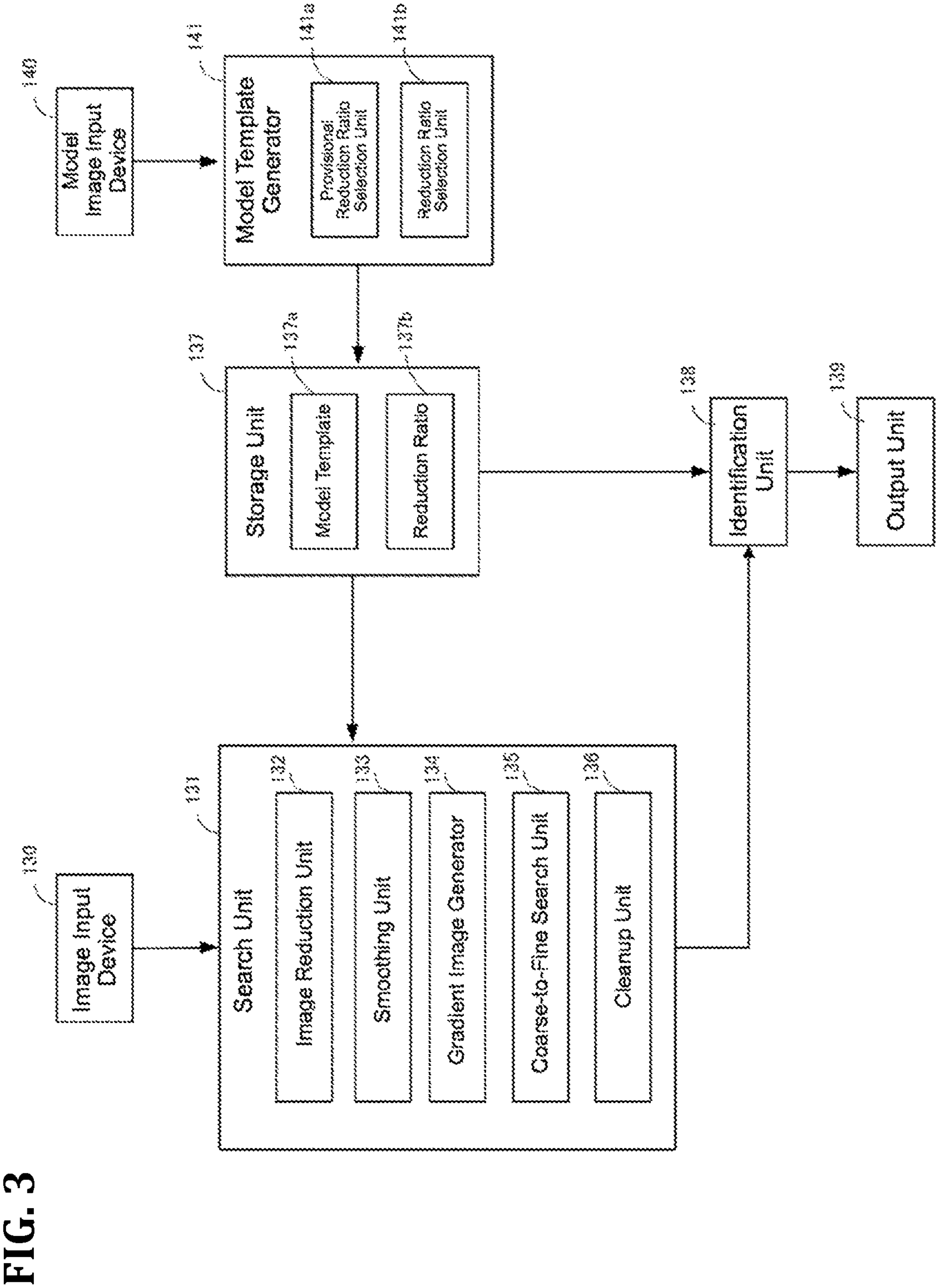
FIG. 3 illustrates the type classification function in the image identification device.

FIG. 3 illustrates the type classification (object classification) functions provided in the image processing device. The image processing device 10 is provided with an image input unit 130, a search unit 131, a storage unit 137, an identification unit 138, an output unit 139, a model image input unit 140, and a model template generator 141 which are all involved in identifying the type of object. These functional blocks are implemented by executing a computer program on the CPU 110 in the image processing device 10.

Model templates generated by the model template generator 141 are stored in the storage unit 137. A model template is generated by reducing a model image input from the model image input unit 140 at a predetermined reduction ratio and extracting features from the reduced image. The embodiment employs a coarse-to-fine search (i.e., a pyramid search); therefore, a plurality of model templates are generated and stored that are a sequence of reductions of a single model image with increasing reduction ratios. Note that in this specification the lowest reduction ratio used when generating a model template is referred as the reduction ratio for the model template.

The model template 137*a* and the reduction ratio 137*b* for the model template are stored in association with each other in the storage unit 137. The storage unit 137 stores the number of model templates corresponding to the different types of objects to be classified. The model template generator 141 determines a reduction ratio so that as much as possible the reduction ratio for each of the models is the same. Therefore, there are at least two model templates (one set of model templates) in the storage unit 137 that have the same reduction ratio.

Image Processing Device: Operations

The image processing device 10 functions in two modes: an "operation mode" where images of the work pieces 2 sign on the conveyor 3 are acquired, and searches (i.e., matching) and type presentation, or the like are performed; and a "registration mode" carried out before the operation mode wherein models are registered for the image processing device 10. A user may switch between modes of desired. The model templates 137*a* that are stored in the storage unit 137 are generated during registration mode by the model template generator 141.

The "operation mode" is described below assuming that model templates 137*a* are already generated. The process of registering a model during "registration mode" is then described.

(1) Operation Mode

Figure 4:
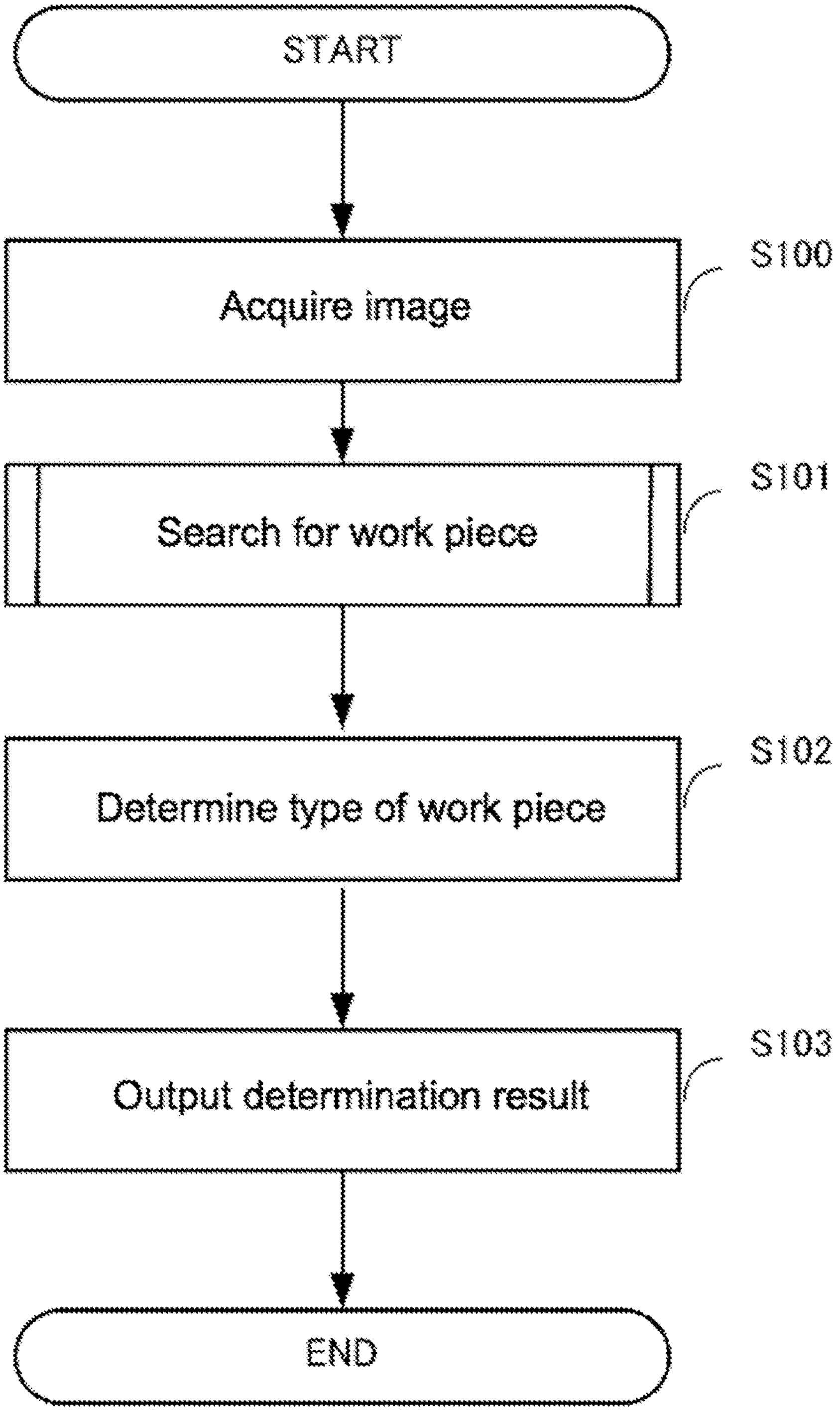
FIG. 4 is a flowchart of the type classification process during an operation mode.

The operations are described referring to the flowchart in FIG. 4. An overview of the type classification process is also provided with reference to the flowchart in FIG. 4.

Figure 5:
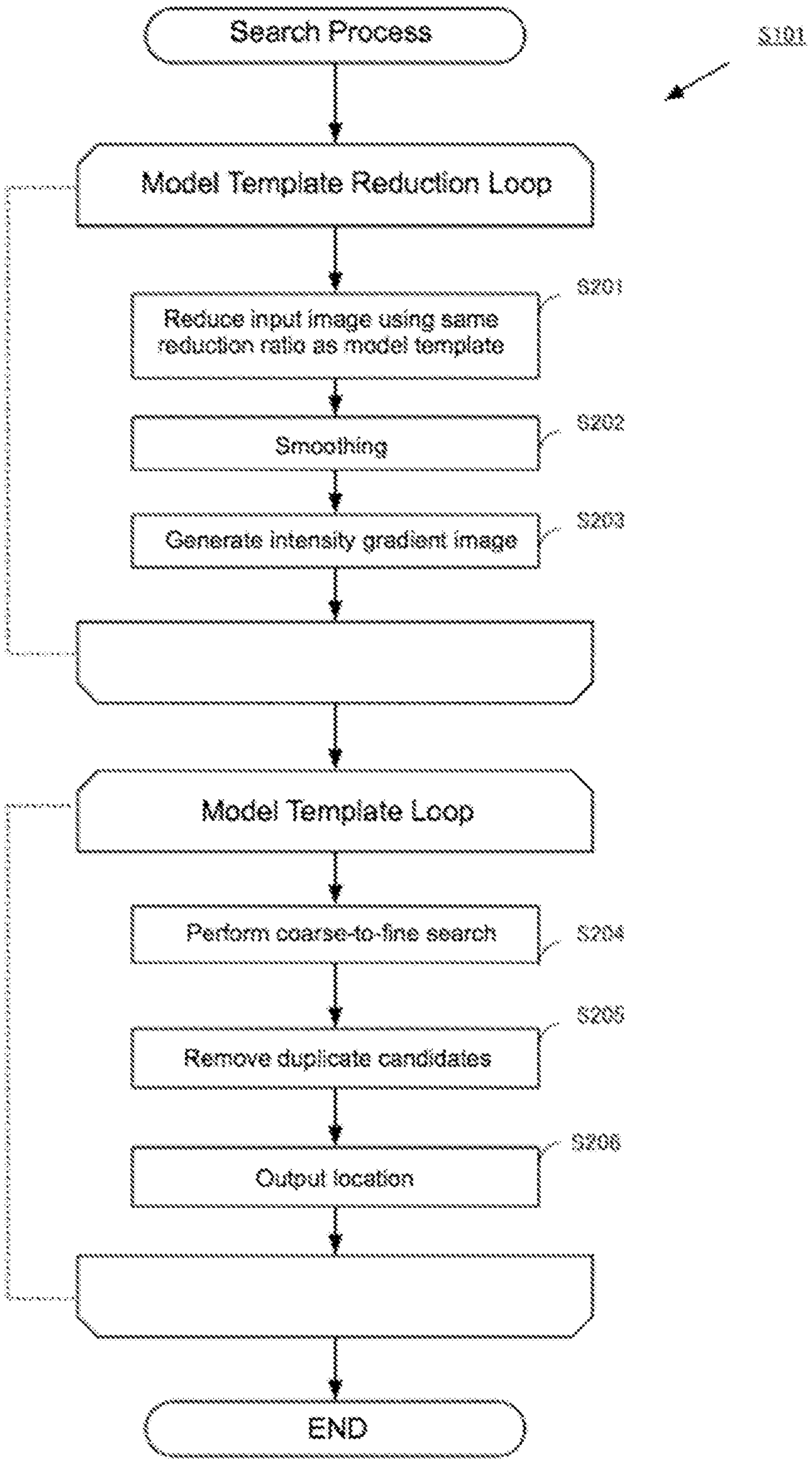
FIG. 5 is a flowchart illustrating the details of the search process during step S101 in FIG. 4.

On receiving input of a trigger signal from the PLC 4, the image input unit 130 acquires an image from the camera 11 (step S100). Next, the search unit 131 detects the individual work pieces 2 in the input image (step S101). The search (matching) process (step S101) is described in detail with reference to FIG. 5. The search unit 131 acquires the reduction ratio of the model template 137*a* stored in the storage unit 127, and repeats steps S201 to S203 for each reduction ratio. The steps S201 to S203 are pre-processes for the search.

In step S201 the image reduction unit 132 uses an image reduction process to reduce the input image with the same reduction ratio as the reduction ratio for the model template. Next, in step S202 a smoothing unit 133 uses a smoothing filter to remove noise from the reduced image. In step S203, and intensity gradient image generator 134 generates an intensity gradient image from the smoothed image. The intensity gradient image generator 134 extracts feature points such as edges and corners from the intensity gradient image on the basis of the intensity gradient. The embodiment performs a coarse-to-fine search; therefore, the reduction ratio increases gradually per iteration from reducing the image, through to generating the intensity gradient image.

The actual search of the model from the input image takes place in steps S204 to step S206, and these steps are repeated for each model in the plurality of models. In step S204 the coarse-to-fine search unit 135 employs a coarse-to-fine search technique to search for a model. That is, the initial search is performed with a low-resolution image. After identifying an approximate location, a high-resolution image is used for more precise positioning. The number of levels used in the coarse-to-fine search is not particularly limited. This kind of coarse-to-fine search allows for high-speed and highly accurate positioning. Next, in step S205, a cleanup unit 136 performs a cleanup process that removes similar detection candidates. A plurality of detection candidates appears as a result of the search process in step S204. In this case, the detection candidates at similar locations or with similar positioning are assumed to be identical. At some point one detection candidate is kept while the others are removed to eliminate the duplicate detection candidates. This is what is referred to as the cleanup process. Thus, the search unit 131 outputs the location of the model obtained from the input image. The above processes are used to find the locations of all the registered models in the storage unit 137 that are in the input image.

Returning to the flowchart in FIG. 4, the remainder of the type classification process is described. In step S102, the identification unit 138 analyzes the work piece detected by the search process and determines the type of work piece. When detecting with models that are similar, a plurality of models will match a work piece during the identification process. The identification unit 138 determines which of the models best matches the detected work piece. Various techniques may be used for this determination. For instance, the type for the work piece may be selected as the model with the highest degree of similarity to the work piece. Alternatively, the features extracted from the detected work piece may be input into an identifier used for identifying the type of model, to thereby determine the type of work.

Step S102 is repeated for all work pieces detected in step S101 to determine the type for each of the work pieces. The results of the classification are output to the display 12 or to the PLC 4 via the output unit 139 (step S103).

The effects of this proposed technique are described with reference to FIGS. 6(*a*), (*b*). FIG. 6(*a*) outlines the processing of the proposed method; FIG. 6(*b*) outlines the processing of existing methods (a comparative example). Typically, the image reduction process, the smoothing process, and the intensity gradient image generating process must be repeated for each of the models. In contrast, in the proposed method, the image reduction process, the smoothing process, and the intensity gradient image generating process can be performed jointly on the model templates with identical reduction ratios (the dotted line portion). Accordingly, the above-mentioned processes do not need to be repeated for each model, thereby improving the processing speed. These processes are comparatively computationally expensive, because the processes are applied to the entire image; therefore reducing the number of executions effectively improves the processing speed. For instance, consider the processing time in a case where there are five models as illustrated in FIGS. 6(*a*), (*b*). Assume the overall processing time needed for the search is one second, and preprocesses such as image reduction, smoothing, and the intensity gradient image generation takes up half that time.

In that case, with existing techniques the entire search process must be executed for each model, and thus the processing time is: 1 sec×5 models=5 sec. On the other hand, preprocessing is executed only once in the proposed method, and thus the processing time is: 0.5 sec+0.5 sec×5 models=3 sec. In other words, compared to existing techniques, the proposed method reduces the processing time by 40%. Note that the example in FIGS. 6(*a*) and 6(*b*) maximizes this effect because all the models are given the same reduction ratio. However, it is possible to share preprocessing among models as long as the reduction ratio of at least two models is the same, and thus it is possible to provide a shorter processing time than when using existing techniques.

(2) Registration Mode

The model registration process that takes place during the registration mode is described, and in particular, the procedure for determining the reduction ratio for a model is described. Note that the processing show in FIG. 7 may be executed when, for example the image sensor 1 is newly installed, or when there is a change in the type of work pieces flowing along the production line.

First, in step S301 the model image input unit 140 sends an image of the model to be registered. For instance, the camera 11 captures images of a plurality of different types of objects (models) with parameters identical to the parameters that will be used when the sensor system is operating. A user specifies a region in a captured image, and the model image input unit 140 acquires an image of the region designated by the user as a model image.

A provisional reduction ratio selection unit 141*a* in the model template generator 141 determines an ideal reduction ratio (provisional reduction ratio) for each of the model images. While a higher reduction ratio improves the processing speed, the identification accuracy deteriorates. In contrast, a lower reduction ratio improves the identification accuracy; however, the lower reduction ratio has limited impact on the processing speed. Therefore, the provisional reduction ratio selection unit 141*a* takes into account the trade-off between speed and accuracy, and determines a suitable reduction ratio for the model image in accordance with a predetermined standard. For example, the provisional reduction ratio selection unit 141*a* may select a provisional reduction ratio so that the number of features included in a model is a predetermined number, or, so that the area of the region registered for the model is a predetermined size. A provisional reduction ratio obtained in this manner will typically differ for each of the models.

The ideal reduction ratio will thus differ for each of the models; however, the model template generator 141 attempts as much as possible to assign the same reduction ratio to the models in a manner that avoids reducing the processing speed or the identification accuracy. More specifically, in step S303, a reduction ratio selection unit 141_b_ in the model template generator 141 groups the models to reduce the variation among the provisional reduction ratios for the models within a group. A clustering algorithm such as K-means clustering may be used group the models; however, the grouping process may also be implemented using the following simplified procedure.

The grouping process (step S303) is described in detail with reference to FIG. 8. The model template generator 141 first sorts the plurality of models so that the provisional reduction ratios are in ascending order (S401). A variable G is then initialized to the value “1” to represent the group number (S402). The following steps S403 to S408 are repeated for each model in the plurality of models. Here, the models are processed in order of provisional reduction ratio, from smallest to largest.

First, an unprocessed model having the smallest provisional reduction ratio is added to group G; the standard deviation of the provisional reduction ratios in the group is then calculated (S404). If the standard deviation calculated is below a given threshold (YES, S405), then the model is added to the group G. That is, a model may be added to the group G if the variation among the provisional reduction ratios is within a tolerable range. Whereas, if the standard deviation calculated in step S404 exceeds the threshold (NO, S405), the model is removed from group G, and the model may not be added to group G (step S406). This model is then included in a new group. In other words, the variable G, which represents the group number, is incremented by 1 (S407), and the model is added to the (updated) group G (S408).

The above steps S403 to S408 are repeated for all the models. The grouping process is complete when the final variation (standard deviation) among the provisional reduction ratio within each of the groups is below the given threshold.

Figure 8:
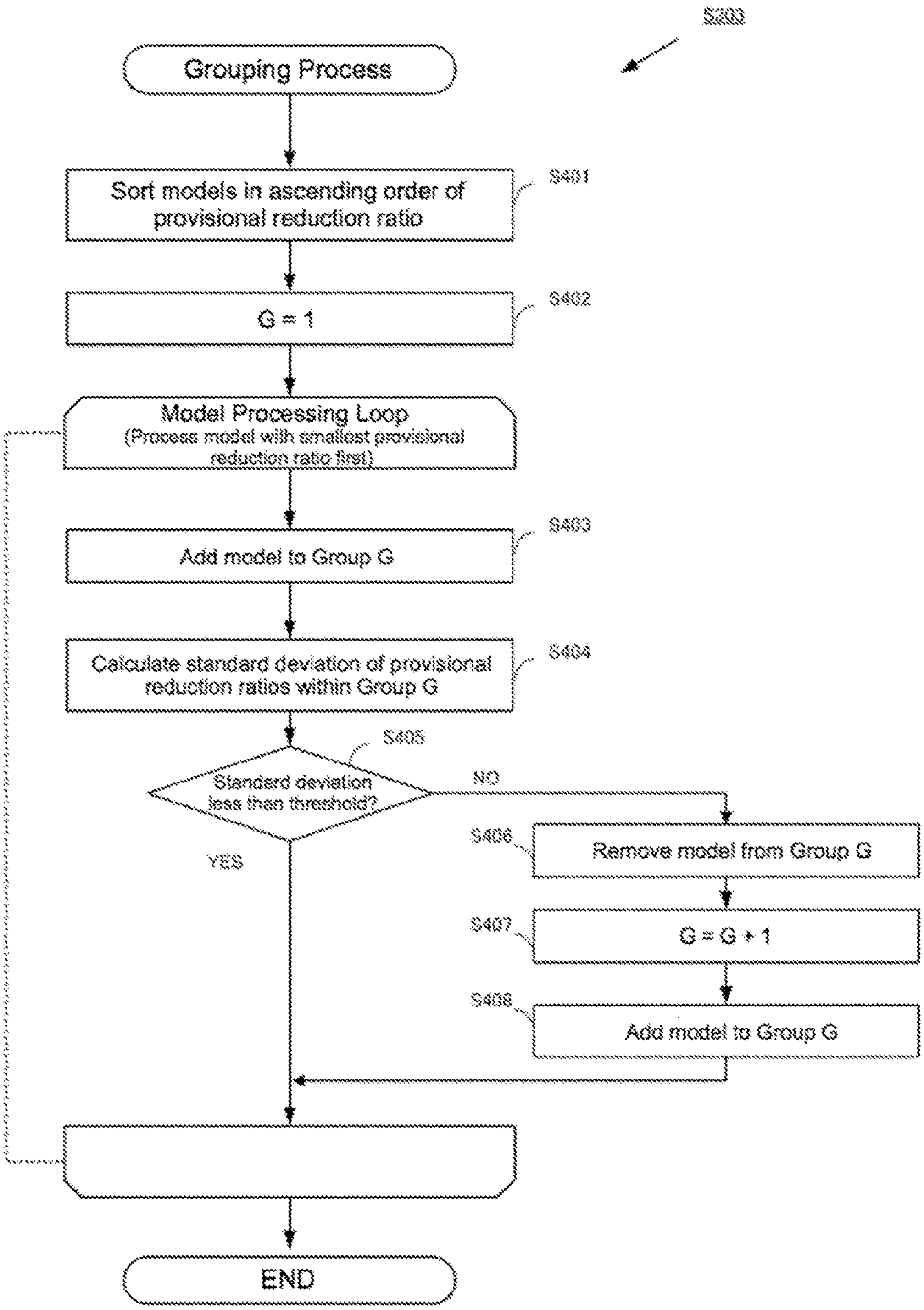
FIG. 8 is a flowchart illustrating the details of the grouping process during step S303 in FIG. 7.

An example of the grouping process illustrated in FIG. 8 is described with reference to FIG. 9. Here, assume there are seven types of models, Model A to Model G, and the provisional reduction ratios are: A=0.3; B=0.33; C=0.42; D=0.65; E=0.67; F=0.71; and G=0.75. The threshold selected for the standard deviation is 0.05.

First, Model A having the smallest provisional reduction ratio, is added to Group 1. Next, the standard deviation of the provisional reduction ratio is calculated for Group 1 assuming Model B was added to Group 1. As illustrated in FIG. 9(_a_), the standard deviation calculated is 0.021 which is below the threshold; therefore it is determined that Model B can be included in Group 1. Next, the standard deviation of the provisional reduction ratios is calculated for Group 1 assuming Model C was added to Group 1. As illustrated in FIG. 9(_b_), the standard deviation calculated is 0.062 which exceeds the threshold; therefore it is determined that Model C cannot be included in Group 1. Here it is determined that Group 1 should include only Model A and Model B, while Model C is included in a newly created Group 2. Next, the standard deviation of the provisional reduction ratio is calculated for Group 2 assuming Model D was added to Group 2. As illustrated in FIG. 9(_c_), the standard deviation calculated is 0.16 which exceeds the threshold; therefore it is determined that Model D cannot be included in Group 2. That is, it is determined that Group 2 should include only Model C, while Model D is included in a newly created Group 3. As above mentioned, models are added to a group in order, smallest provisional reduction ratio first, and it is determined whether or not adding the model causes the standard deviation of the provisional reduction ratio in the group to exceed the threshold. In this example, when added to Group 3. Models E, F, and G all result in a standard deviation that is below the threshold as illustrated in FIGS. 9(_d_), 9(_e_), and 9(_f_). Therefore, Group 3 is established to include Models E, F, and G. As above described, the seven models, Models A to G are divided into three groups: (A, B), (C), and (D, E, F).

Although the flowchart of FIG. 8 depicts the grouping process taking place in order from the smallest to the largest provisional reduction ratio, the process may take place in order from the largest to the smallest provisional reduction ratio. Alternatively, the process may start with the maximum and minimum provisional reduction ratios. If at the end of the grouping process, the standard deviation of the provisional reduction ratios within a group is below the given threshold, then any desired procedure may be used. Finally, although the standard deviation is adopted here as a measure of the variation, dispersion or a difference between the maximum and minimum values may also be adopted.

Figure 7:
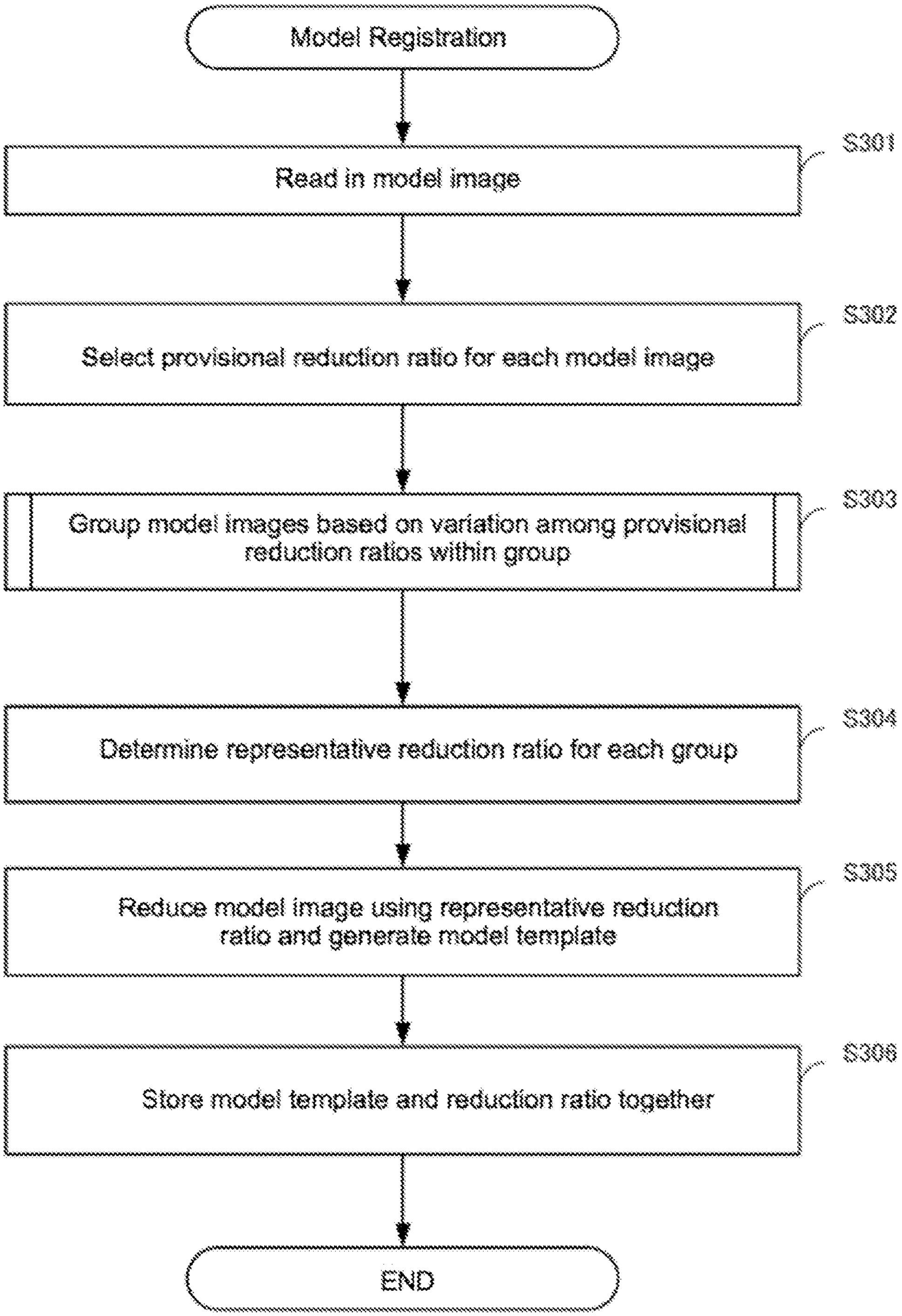
FIG. 7 is a flowchart of the model registration process during a registration mode.

Returning to the flowchart in FIG. 7, the remainder of the registration process is described. Once grouping is complete, the reduction ratio selection unit 141_b_ determines a representative reduction ratio for each group (step S304). In this example, the mean of the provisional reduction ratios in the group is selected as a representative reduction ratio of the group. For instance, as illustrated in FIG. 9(_f_), the representative reduction ratio for Group 1 composed of Models A, B is 0.315; is 0.42 for Group 2 which is composed of only Model C; and is 0.695 for Group 3 composed of Models E, F, G. Note that the representative reduction ratio is not limited to being the mean of the provisional reduction ratios within a group, and may be the median or the mode.

In step S305, the model template generator 141 determines the group to which a model belongs, reduces the model image of the model using the representative reduction ratio for the group, and thereby generates a model template. The model template generator 141 repeats this process for each model. In the embodiment, the identification process also makes use of intensity gradient features. Here, the reduced model image is used to generate an intensity gradient image, and the features computed from the intensity gradient image serve as the model template. Finally, because the embodiment performs coarse-to-fine searches, a model template is also generated on the basis of a model image reduced at a reduction ratio that is higher than representative reduction ratio.

In step S306, the model template generator 141 outputs the model template generated together with the reduction ratio for the model template to the storage unit 137. Hereby the model template 137_a_ and the reduction ratio 137_b_ for the model template are stored in association with each other in the storage unit 137.

As above described, a plurality of models may be given the same reduction ratio within a range of values tolerably shifted from the optimal reduction ratio (provisional reduction ratio) of each model.

When registering a model, the embodiment gives a plurality of models the same reduction ratio; therefore, preprocessing of the input image, e.g. image reduction or the feature extraction can be applied jointly to realize an improvement in processing speed. Additionally, when setting the reduction ratios the same for some models, the selection is made so that there is less variation among the provisional reduction ratios within a group (i.e., the variation is below a given threshold). Therefore it is possible to minimize negative effects such as decreased identification accuracy, and the like.

Note that, the above registration process can simply be run again if a model image is added after startup. Given that in this case the original image is required for all the model images, preferably the original model images are kept after the registration process is complete to allow a model image to be added after startup.

Modification Example

Model Registration (Selecting the Reduction Ratio)

Figure 10:
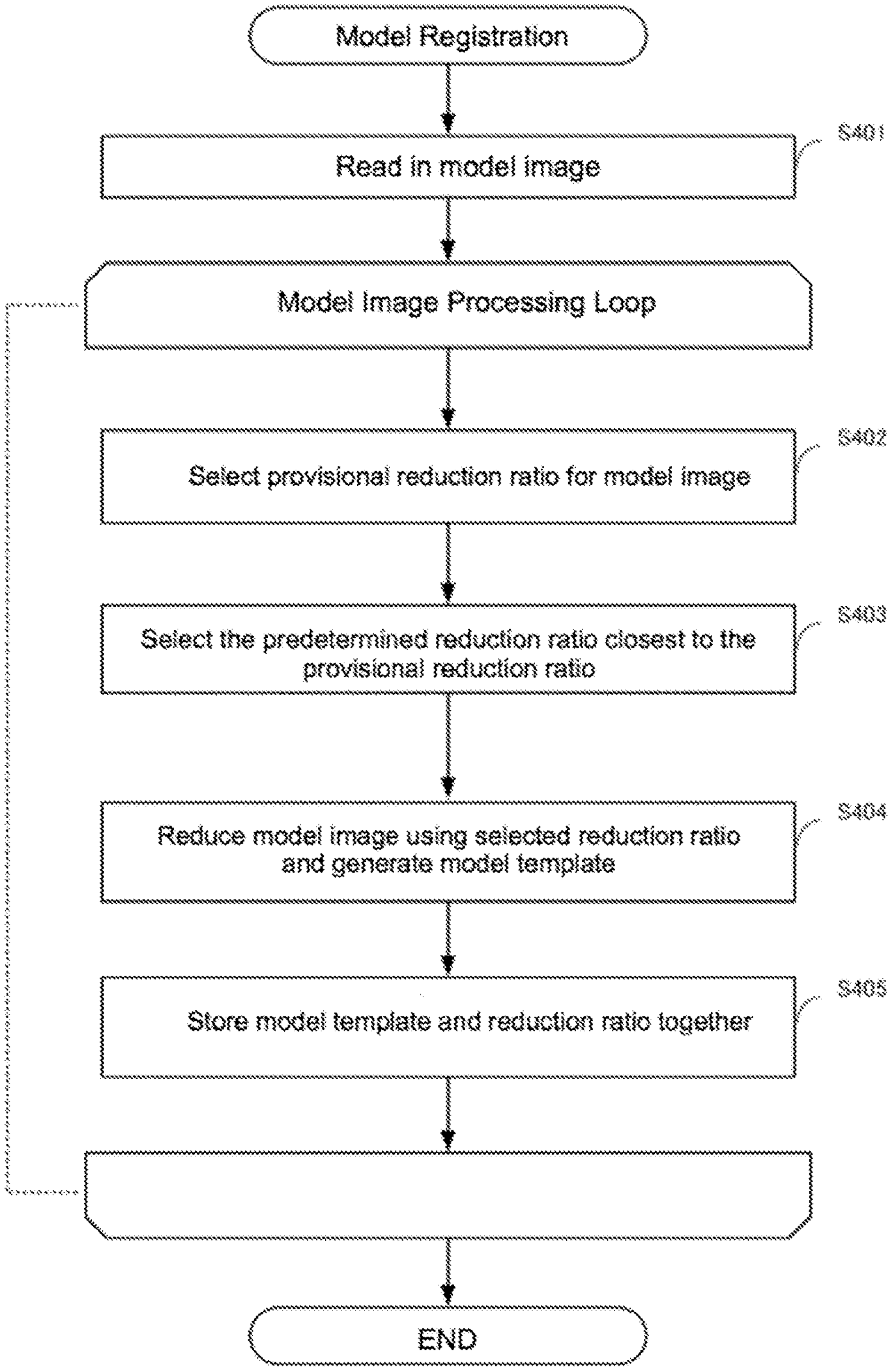
FIG. 10 is a flowchart of a modified example of the model registration process during the registration mode.

In the above description, models are grouped during model registration on the basis of a provisional reduction ratio in order to select a reduction ratio for a model. However, model registration, and the selection of a reduction ratio in particular, may be implemented using other methods. For instance, as an example modification to the registration process, a plurality of predetermined reduction ratios may be stored and any one of the predetermined reduction ratios selected as the reduction ratio for a model on the basis of the provisional reduction ratio of the model. This example of a modified model registration process is described below with reference to FIG. 10.

First, in step S401 the model image input unit 140 sends an image of the model to be registered. Next, the model template generator 141 repeats the following steps S402 to S405 for each model image. The provisional reduction ratio selection unit 141*a* in the model template generator 141 determines an ideal reduction ratio (provisional reduction ratio) for each a model image. This process is identical to the process previously described.

Next, the reduction ratio selection unit 141*b* selects the provisional reduction ratio closest to a reduction ratio in the plurality of preliminarily stored reduction ratios as the reduction ratio for the model image. For instance, assume the plurality of reduction ratios stored in advance is (1.0, 0.707, 0.5, 0.354, 0.25). In this case, if the provisional reduction ratio is 0.3, the actual reduction ratio selected is 0.25. Similarly, a reduction ratio of 0.354 is selected for provisional reduction ratios of 0.33 and 0.42, and a reduction ratio of 0.707 is selected for provisional reduction ratios of 0.65, 0.67, 0.71, and 0.75.

Note that when a plurality of reduction ratios is determined in advance, the selection of the reduction ratio may be obtained based on certain conditions as below. Here, r represents a provisional reduction ratio and R represents a reduction ratio.

If $0.854 \le r, R=1$;

if $0.604 \le r < 0.854, R=0.707$;

if $0.427 \le r < 0.604, R=0.5$;

if $0.302 \le r < 0.427, R=0.354$;

if $r < 0.302, R=0.250$.

In step S404, the model template generator 141 reduces the model image using the reduction ratio selected and generates a model template. In step S405, the model template generator 141 outputs the model template generated together with the reduction ratio for the model template to the storage unit 137.

Thus, a plurality of models may be given the same reduction ratio within a range of values tolerably shifted from the optimal reduction ratio (provisional reduction ratio) for each model. Even if a new model is added after the registration process has been run, with this method no changes are required for the model templates that are already generated. Consequently, this simplifies the process of adding a new model. Another advantage is that there is no need to keep the model image after creating the model template.

In step S403, the reduction ratio closest to the provisional reduction ratio is selected as the reduction ratio for the model. In the above, the distance measure is merely a difference; however, the reduction ratio closest to the provisional reduction ratio may be selected on the basis of any desired distance measure, such as the difference of two squares, the difference of the square roots, or the difference of the logarithms. Furthermore, other methods may be used to select the reduction ratio. For instance, the minimum reduction ratio no less than the provisional reduction ratio may be selected as the reduction ratio for the model; alternatively, the maximum reduction ratio no greater than the provisional reduction ratio may be selected as the reduction ratio for the model.

A total of five reduction ratios between 1 and 0.25 are determined in advance in the above example; however, the number of reduction ratios and the value of the reduction ratios may be modified as appropriate. For instance, the reduction ratio may be a value less than 0.25. Finally, in the above example, the reduction ratios were determined as a geometric progression with a geometric ratio of 0.707; however, the use of a geometric progression is not necessary.

Additional Modification Examples

The above described embodiment is merely one specific example of the invention. The scope of the invention is not limited to this specific example. The invention may adopt various specific configurations insofar as those configurations do not depart from the technical concepts of the invention. For example, the above-mentioned embodiment, the invention is adopted in an object identification device that classifies a plurality of similar objects. The invention may be adopted in any kind of image processing device that identifies or recognizes a plurality of models from an input image; these models do not need to be similar.

The invention is not limited to the specific method of template matching. During the identification process, identification may take place on the basis of features such as edges, corners, intensity gradient direction, or an intensity gradient histogram; furthermore the identification may be performed using intensity, color, or the pixel value itself. Any desired algorithm that provides speed improvements, such as coarse-to-fine searching may be adopted. Any known method of template matching may be adopted in the invention. Note that the process used to create model templates may need to be modified in accordance with the template matching algorithm adopted; however, such a modification is trivial for one skilled in the art.

In the above mentioned embodiment, the model template is created in the image processing device that will perform identification; however, the apparatus used to create the model templates and the apparatus using the model templates may be different. The invention may be implemented as an image identification device (or image processing device that creates a model template by shrinking a model image at a reduction ratio that is the same for at least two models, and uses the model template for identifying an image. The invention may also be implemented as a model template creating device (image processing device) that creates a model template by shrinking a model image at a reduction ratio that is the same for at least two models.

Finally, the invention may be adopted in an image recognition device wherein the model image is an image of an abnormal state, and the image recognition device inspects objects. The invention may also be adopted as an image recognition device that uses template matching on a specified region in an input image without using a search, or performs template matching over an entire input image that is the same size as the model image. Reference Numerals

1 Image sensor
2 Work piece
3 Conveyor
4 PLC
10 Image processing device
11 Camera
12 Display
130 Image input device
131 Search unit
137 Storage Unit
140 Model image input device
141 Model Template Generator

The invention claimed is:

1. An image processing device for identifying or recognizing a plurality of models in an input image, each of the plurality of models comprising a model image, the image processing device comprising:

a memory configured to store, for each model among the plurality of models, a model template and a representative reduction ratio, the representative reduction ratio determined based on a provisional reduction ratio suitable for reducing the respective model image according to a predetermined standard while avoiding reducing identification accuracy, the model template obtained by reducing the model image at the representative reduction ratio;

a processor configured with a program to perform operations comprising:

operation as an image reduction unit configured to, for each model in the plurality of models, reduce the input image by the representative reduction ratio of each model to generate a reduced input image; and operation as a search unit configured to, for each model in the plurality of models, search for a location of a model in the input image in order to identify or recognize the model based on matching a candidate model in the reduced input image with the model template; wherein the memory stores model templates for at least two of the models having the same representative reduction ratio; and the processor is configured with the program to perform operations such that operation as the image reduction unit comprises operation as the image reduction unit configured to process the at least two models jointly by performing the operations as the image reduction unit such that the reduced input image is shared for the at least two models having the same representative reduction ratio.

2. The image processing device according to claim 1, wherein the processor is configured to perform operations further comprising:

operation as a model image input unit configured to receive a model image for each of the models;

operation as a provisional reduction ratio selection unit configured to determine the provisional reduction ratio for each of the model images;

operation as a representative reduction ratio selection unit configured to select the representative reduction ratio for each model image on the basis of the provisional reduction ratios for the plurality of model images; and operation as a model template generator configured to generate a model template for each of the model images by reducing the model image using the corresponding representative reduction ratio, and to store the representative reduction ratio in association with the model template in the memory.

3. The image processing device according to claim 2, wherein the processor is configured with the program to perform operations such that operation as the representative reduction ratio selection unit comprises operation as the representative reduction ratio selection unit configured to group the plurality of model images so that a variation among the provisional reduction ratios within a group is at or below a predetermined threshold; and select the representative reduction ratio for each group.

4. The image processing device according to claim 3, wherein the processor is configured with the program to perform operations such that operation as the representative reduction ratio selection unit comprises operation as the representative reduction ratio selection unit configured to determine a mean of the provisional reduction ratios for the model images within a group and select the mean as the representative reduction ratio for the group.

5. The image processing device according to claim 2, wherein the processor is configured with the program to perform operations such that operation as the representative reduction ratio selection unit comprises operation as the representative reduction ratio selection unit configured to store a plurality of preliminarily determined common reduction ratios; and select the representative reduction ratio from the plurality of predetermined representative reduction ratios that corresponds the provisional reduction ratio of the model image as the representative reduction ratio of the model image.

6. The image processing device according to claim 5, wherein the processor is configured with the program to perform operations such that operation as the representative reduction ratio selection unit comprises operation as the representative reduction ratio selection unit configured to select the representative reduction ratio from the plurality of predetermined representative reduction ratios that is closest to the provisional reduction ratio of the model image as the representative reduction ratio of the model image.

7. An image sensor comprising: a camera configured to capture images of an object; and the image processing device according to claim 1 configured to identify or recognize the model from the input image from the camera, and to output a result.

8. An image processing device for generating model templates for a plurality of models, the image processing device comprising:

a processor configured with a program to perform operations comprising:

operation as a model image input unit configured to receive a model image for each of the plurality of models;

operation as a provisional reduction ratio selection unit configured to determine a provisional reduction ratio for each of the model images;

operation as a representative reduction ratio selection unit configured to select a representative reduction ratio for each model image on the basis of the provisional reduction ratios determined for the plurality of model images, the representative reduction ratio selected to be the same as the representative reduction ratio for a different model image provided that a variation among the provisional reduction ratio for the different model image and the provisional reduction ratio of the model image is at or below a predetermined threshold; and operation as a model template generator configured to generate a model template for each of the model images by reducing the model image using the corresponding representative reduction ratio; and operation as an output unit configured to output the model template generated together with the corresponding representative reduction ratio.

9. The image processing device according to claim 8, wherein the processor is configured with the program to perform operations such that operation as the representative reduction ratio selection unit comprises operation as the representative reduction ratio selection unit configured to group the plurality of model images so that the variation among the provisional reduction ratios within a group is at or below the predetermined threshold; and selects the representative reduction ratio for each group.

10. The image processing device according to claim 9, wherein the processor is configured with the program to perform operations such that operation as the representative reduction ratio selection unit comprises operation as the representative reduction ratio selection unit configured to determine a mean of the provisional reduction ratios for the model images within a group and selects the mean as the representative reduction ratio for the group.

11. The image processing device according to claim 8, wherein the processor is configured with the program to perform operations such that operation as the representative reduction ratio selection unit comprises operation as the representative reduction ratio selection unit configured to store a plurality of preliminarily determined representative reduction ratios; and the representative reduction ratio from the plurality of predetermined representative reduction ratios that corresponds the provisional reduction ratio of the model image as the representative reduction ratio of the model image.

12. The image processing device according to claim 11, wherein the processor is configured with the program to perform operations such that operation as the representative reduction ratio selection unit comprises operation as the representative reduction ratio selection unit configured to select the representative reduction ratio from the plurality of predetermined representative reduction ratios that is closest to the provisional reduction ratio of the model image as the reduction ratio of the model image.

13. An image processing method for identifying or recognizing a plurality of models in an input image, the image processing method comprising:

causing a computer having a memory configured to store for each model among a plurality of models, a model template obtained by reducing a model image by a representative reduction ratio, to perform operations comprising:

reducing the input image by the representative reduction ratio of each model template to create a reduced input image for each reduction ratio of each model template;

searching for a location of one or more of the plurality of models in the input image by identifying one or more of the plurality of models in one of the reduced input images based on the model template of the corresponding representative reduction ratio; and storing in the memory, model templates for at least two of the models reduced using the same representative reduction ratio, wherein reducing the input image by the representative reduction ratio of each model template is performed jointly on the models having the same representative reduction ratio such that the reduced input image is shared for the at least two models reduced using the same representative reduction ratio.

14. An image processing method for generating model templates for a plurality of models, the image processing method comprising:

receiving, in a processor, a model image for each of the models;

determining, via the processor, an ideal reduction ratio as a provisional reduction ration for each of the model images;

selecting, via the processor, a representative reduction ratio for each model image on the basis of the provisional reduction ratios determined for the plurality of model images, the representative reduction ratio selected to be the same as the representative reduction ratio for a different model image provided that a variation among the provisional reduction ratio for the different model image and the provisional reduction ratio of the model image is at or below a predetermined threshold;

generating, via the processor, a model template for each of the model images by reducing the model image using the corresponding representative reduction ratio; and outputting, from the processor, the model template generated together with the corresponding representative reduction ratio.

15. A non-transitory computer readable medium having an instruction stored thereon, which when executed, causes a processor to perform operations comprising:

reducing an input image by a representative reduction ratio of each of a plurality of models to create a reduced input image;

searching for a location of one or more of the plurality of models in the input image by identifying one or more of the plurality of models in one of the reduced input images based on a model template of the corresponding representative reduction ratio; and storing in a memory, model templates for at least two of the models reduced using the same representative reduction ratio, wherein reducing the input image by the representative reduction ratio of each model to create the reduced input image is performed jointly on the models having the same representative reduction ratio such that the reduced input image is shared for the at least two models reduced using the same reduction ratio.

16. A non-transitory computer readable medium having an instruction stored thereon, which when executed, causes a processor to perform operations comprising:

receiving a model image for each of a plurality of models;

determining an ideal reduction ratio as a provisional reduction ration for each of a plurality of model images;

selecting a representative reduction ratio for each model image on the basis of the provisional reduction ratios determined for the plurality of model images, the representative reduction ratio selected to be the same as the representative reduction ratio for a different model image provided that a variation among the provisional reduction ratio for the different model image and the provisional reduction ratio of the model image is at or below a predetermined threshold;

generating a model template for each of the model images by reducing the model image using the corresponding representative reduction ratio; and outputting the model template generated together with the corresponding representative reduction ratio.

* * * * *